United States Patent [19]

Everman et al.

[11] Patent Number: 5,487,791
[45] Date of Patent: Jan. 30, 1996

[54] STOWABLE AND SELF-DEPLOYABLE PARALLELOGRAM-TYPE PANEL ARRAY

[75] Inventors: Michael R. Everman; David M. Murphy, both of Santa Barbara; James J. Wachholz, Goleta, all of Calif.

[73] Assignee: AEC Able Engineering Co., Inc., Goleta, Calif.

[21] Appl. No.: 249,125

[22] Filed: May 25, 1994

[51] Int. Cl.$^6$ ............................................... H01L 31/045
[52] U.S. Cl. ........................... 136/245; 136/292; 244/173
[58] Field of Search ................................ 136/245, 292; 244/173

[56] References Cited

U.S. PATENT DOCUMENTS 3,460,992  8/1969  Avilov et al. ........................... 136/245

Primary Examiner—Aaron Weisstuch
Attorney, Agent, or Firm—Donald D. Mon

[57] ABSTRACT

A stowable and self-deployable parallelogram-type panel array for solar cells. The array includes two sets of rigid panels, the panels of each set being hinged together, and the sets extending side-by-side along a central axis. The sets are foldable, and are pivoted together at their central points so as to form parallelogram-type structures. A respective yoke is hinged to each set to coordinate the movement of the sets. The yokes are hinged to a base on the opposite side of the axis from their respective set to provide greater structural stability and a higher first node resonant frequency. Deployment force is exerted by self-powered hinges, and are the only source of deployment force. The yokes are joined by gears to coordinate their rotation and thereby the stowing and deploying of the array.

8 Claims, 3 Drawing Sheets

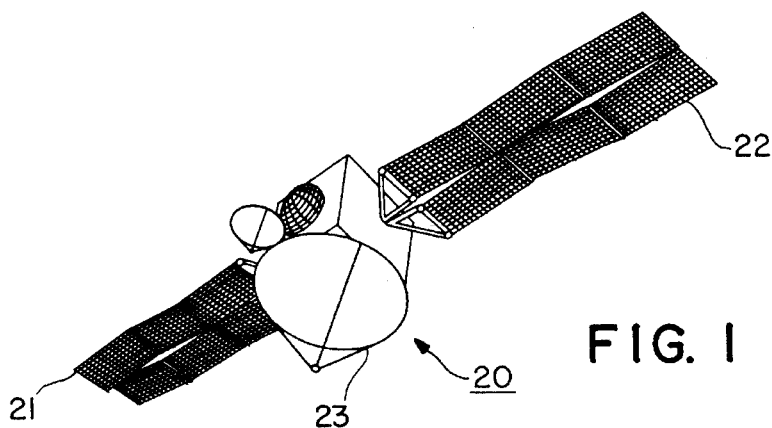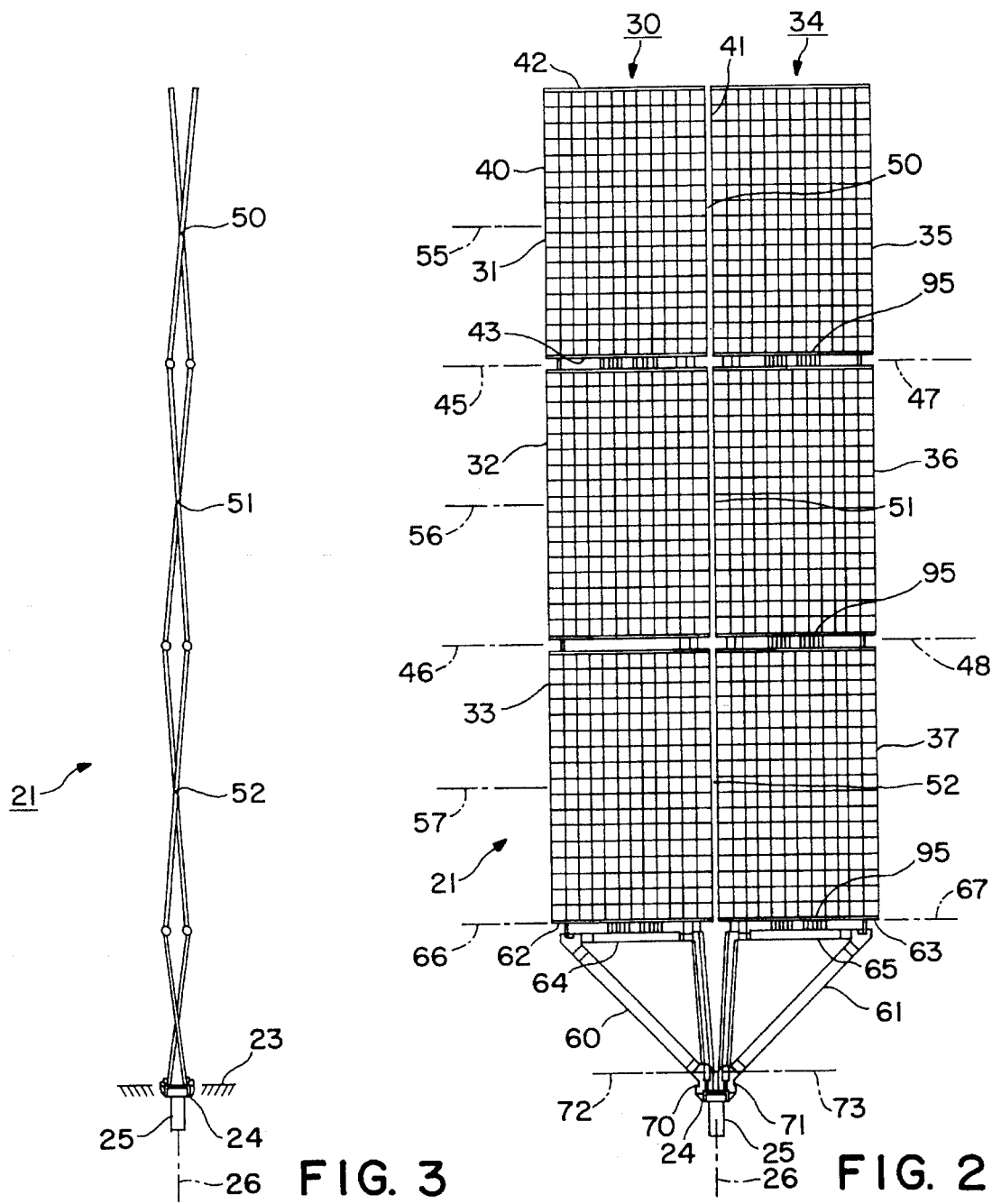

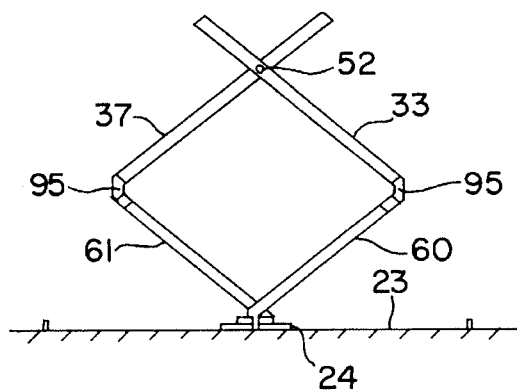
FIG. 4
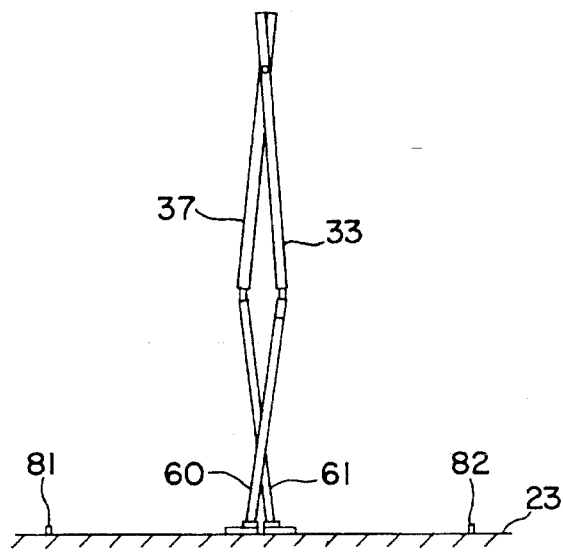
FIG. 5
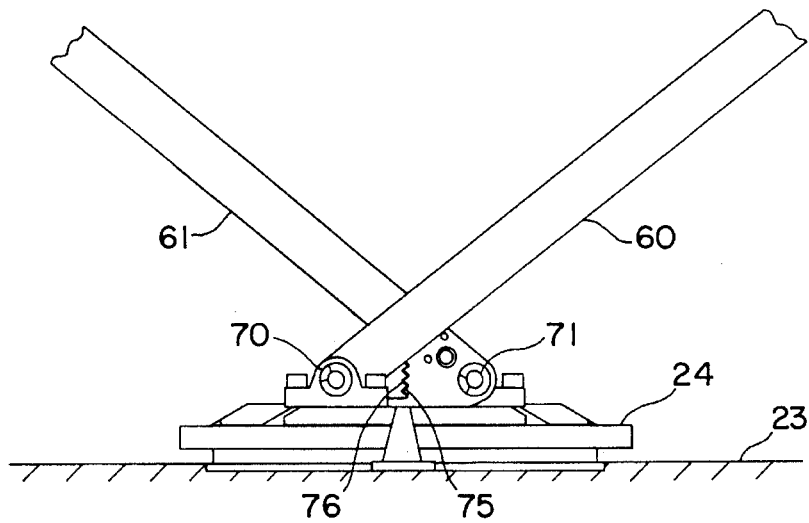
FIG. 6
FIG. 7

STOWABLE AND SELF-DEPLOYABLE PARALLELOGRAM-TYPE PANEL ARRAY

SPECIFICATION

1. Field of the Invention

A panel array including two sets of rigid panels, the sets being arranged side-by side. The ends of the panels of each set are joined by fold hinges. Each panel of each set is pivotally joined at its mid-point to the mid-point of a panel of the adjacent set to form a foldable parallelogram-type structure. The fold hinges incorporate bias means which exerts a bias force to deploy the array.

2. Background of the Invention

Especially in the field of solar cell arrays used in spacecraft, and in other fields and applications as well, there is a continuing need to provide arrays of panels to support solar cells in an arrangement which can be deployed optimally to expose all of the cells to solar energy, and which can be stored in a more compact shape and volume.

The need to reduce the weight and volume of the array reflect the extraordinarily high cost of placing a satellite package in orbit. Reduction of weight is a principal effort of the designer, not only to reduce the total weight of the array package, but also to reduce the bulk and cost of the vehicle which carries it. An increase in bulk of the array package can require increasing the size of the vehicle. The costs speedily increase.

Among the costs of known deployable arrays are those of power means to drive the array to its deployed condition. Motors, and powered reels and lanyards are well known examples. Elimination of separate power means for deployment will save their weight.

Another objective of well-designed solar cell arrays is to provide the arrays so they can accurately be directed relative to the sun. The optimal alignment is for every cell to be perpendicular to the incident rays from the sun. Any divergence from strict perpendicularity will result in a reduction in efficiency of the cells. Accordingly as the designer contemplates new structures for cell support, he must balance the economics of lesser weight versus reduced efficiency of the cells.

Heretofore, optimal efficiency of the cells has been regarded as the principal design criterion, while increased weight was accepted as a penalty for greater cell efficiency and output.

BRIEF DESCRIPTION OF THE INVENTION

A stowable and deployable panel array according to this invention includes two side-by-side sets of panels. Adjacent panels in each set are hinged to each other at fold hinges. Each panel of each set is also pivotally joined at its mid-point to the mid-point of a panel of the adjacent set by a pivot hinge. This forms a foldable parallelogram structure.

A separate yoke is attached to the end panel of each set at attachment axes. The yokes are pivotally mounted to a base for rotation relative to it. The yokes are independently mounted to a yoke bearing, and include meshing coordinating gears which coordinate their rotation relative to one another.

According to a feature of this invention, each of the arrays includes at its fold axes, hinges which include power means that bias the adjacent panels toward the deployed condition of the arrays.

According to a preferred but optional feature of the invention, the power means in the hinges is a torsional coil spring.

According to yet another preferred but optional feature of the invention, the pivot hinge includes redundant means to enable relative rotation of the panels at their mid-points.

According to yet another preferred but optional feature of the invention, means is provided to enable greater thermal expansion of some panels than of others while in the stowed condition without moving the panels from their intended stowed alignment.

The above and other features of this invention will be fully understood from the following detailed description and the accompanying drawings, in which:

BRIEF DESCRIPTION OF THE DRAWINGS

FIG. 1 is a schematic view of a spacecraft carrying a pair of deployed arrays according to this invention;

FIG. 2 is a side elevation showing one of the arrays of FIG. 1 in its deployed condition:

FIG. 3 is a left hand side elevation of FIG. 2;

FIG. 4 is a side view of the array of FIG. 2 in its stowed condition;

FIG. 5 is a schematic side view showing the lower part of the array partly deployed;

FIG. 6 is a schematic side view showing the lower part of the array fully deployed;

FIG. 7 is a side view of the yokes and of the means to mount and coordinate them;

DETAILED DESCRIPTION OF THE INVENTION

Figure 8:
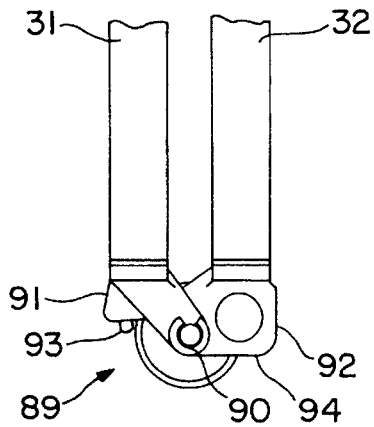
FIG. 8 is a side view of a fold hinge with adjacent panels in their stowed condition.

FIG. 1 shows a spacecraft 20 with two arrays 21, 22 deployed from it. The spacecraft as schematically shown represents any kind of orbiting satellite that derives its power from solar cells mounted to the arrays. When the spacecraft is sent aloft, the arrays will be in their stowed condition, confined appropriately by the structure 23 of the craft.

FIG. 2 shows array 21 in greater detail in its deployed condition. The array includes a base member 24 for its support by the spacecraft, which will be fitted to directional alignment means such as a gimbal 25 to properly align the array.

The array has a central axis 26 which is concentric with gimbal 25. It is important to observe that only the entire array as a unit can be rotated around axis 26. All internal movements of the array structure are either longitudinal along the axis, or around axes that intersect axis 28 or are perpendicular to an axial plane which includes the central axis.

The array includes a first set 30 of panels 31, 32, 33, and a second set 34 of panels 35, 36, 37. These panels are rigid and preferably rectangular. Each panel has a pair of parallel sides 40, 41 and parallel ends 42, 43. Each panel carries a group of solar cells of any suitable type, together with circuit elements required to connect them into a useful circuit.

Two fold axes 45, 46 are shown, along which fold action occurs between adjacent panels of the first set 30. These fold axes are normal to a plane which includes the central axis. In practice they will always be displaced laterally from the central axis for a reason to be disclosed.

Two fold axes 47, 48 are shown along which a folding action occurs between panels of the second set 34. Fold hinges, which will be described in detail below, join adjacent panels of the same set, in both sets.

Pivot hinges 50, 51, 52 join adjacent panels of the sets at the midpoint of their respective sides. Pivot hinge 50 pivotally joins panels 31 and 35. Pivot hinge 51 pivotally joins panels 32 and 36 at the midpoint of their respective sides. Pivot hinge 52 pivotally joins panels 33 and 37 at the midpoint of their respective sides. The hinges are aligned with pivot axes 55, 56 and 57, which are parallel to one another, intersect the central axis, and are normal to a plane which includes it, in this case a plane that is normal to the sheet in FIG. 2.

Figure 10:
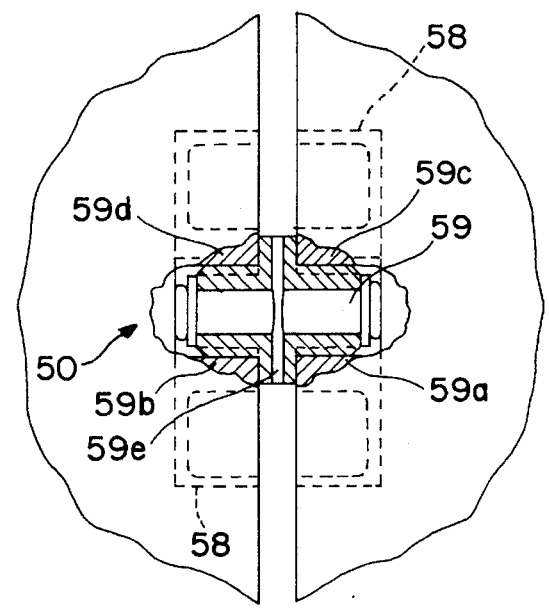
FIG. 10 is an axial cross-section of an optional pivot hinge useful in this invention.

Pivot hinge 50, which is identical to pivot hinges 51 and 52, is shown in axial cross-section in FIG. 10. Because the panels will usually be made of lightweight honeycomb material, metal inserts 58 will often be set in the panels to receive the hinge. Of interest to this invention is freely fitted pin 59, with independent bearing surfaces 59a, 59b in respective panels. Surfaces 59a and 59b are rotatably fitted in bearings 59c, 59d. They are separated by, and bear against, a washer 59e that fits freely around the pin. One end of the pin is physically mushroomed versus the machined head on the other end to hold the assembly together. The bearings are fixed in the inserts, usually by threading with suitable thread locking compound.

It will be observed that if rotation around either surface 59a or 59b occurs, the pin is free to rotate in the other. This redundancy reduces the risk of binding at the pivot hinges.

A first yoke 60 mounts set 30 of panels. A second yoke 61 mounts set 34 of panels. The yokes are lightweight rigid structures which are mounted to the base member. Ends 62, 63 of panels 33 and 37 are hinge-mounted to attachment arms 64, 65 of yokes 60 and 61, respectively, so that panels 33 and 37 can fold relative to the yokes, around attachment axes 66, 67 respective to yokes 60 and 61. Attachment axes 66 and 67 are parallel to the fold axes and to the pivot axes.

The yokes are mounted to bearing 70, 71 in the base member so as to rotate around respective yoke axes 72 and 73. The yoke axes are parallel to the fold axes and pivot axes. Notice that the yokes rotate around the yoke axes, and not around the central axis. Their movement is in the opposite rotational sense from one another. It is an important feature of this invention that when they move out of the plane of FIG. 2, the angles which they make with the plane of FIG. 2 are equal.

This equality is maintained by a pair of meshed coordinating gears 75, 76, (FIG. 7) respectively mounted to yokes 60 and 61. Rotation of one gear in one direction drives the other equally in the opposite direction. The combination of the two yokes cannot be rotated in the same direction around the yoke axis because the gears lock one another against such movement. These gears therefore maintain the alignment of the central axis relative to the base member, while coordinating the angular movement of the yokes.

It is a convenience in the construction of this device for the yoke axes to be spaced apart from the central axis, and for the yokes to cross over one another as seen in side view in FIGS. 3 and 7. Again it is emphasized that each yoke is entirely on its own side of the central axis. Their movements are in the opposite algebraic angular sense from one another. This arrangement, usually about 5 degrees off-angle from the central axis, creates structural depth, thereby enhancing stiffness and fundamental frequency.

The kinematics of this construction will be understood from a study of FIGS. 2–6. FIG. 4 shows the array in its stowed configuration. The yokes will have been brought down so as to be parallel to one another and to base structure 23. Steady rests 81, 82 are provided on which the edges of the stowed stack will rest.

FIG. 5 shows the array partly deployed, on its way toward full deployment. The yokes are rising from their lower position, and all of the lateral axes- attachment, pivot and fold, remain parallel and are also rising.

Finally the array reaches its full deployment as shown in FIGS. 2, 3, and 6. The fold axes have reached their nearest permitted approach to the central axis. The pivot axes remain on the central axis, and all of the lateral axes have reached their farthest permitted distance from the base member.

It will be observed that the yoke axes and the fold axes stand apart from the central axis in the deployed condition. The geometric relationship of the panels, fold axes and pivot axis would permit parallelism of the panels if the attachment axes were brought to the central axis. This is avoided by an arrangement yet to be described in order to provide greater rigidity of the deployed structure. If total parallelism were permitted, there would result a blade-like structure more subject to vibration. The illustrated arrangement enables a lighter-weight structure to be used, wherein the panels need not be reinforced by additional structure. The trade-off is a slightly reduced efficiency of the solar cells. When the included angle between panels 33 and 37 as viewed in FIG. 3 is about 10 degrees, the reduction in efficiency is only about 0.4%, and the weight of the total structure for approximately the same deployed stiffness is reduced by about 87%. This saving of weight justifies the small reduction in cell efficiency.

An important feature of this invention is that it does not require external means for its deployment. Motors to power the yoke for example, would be costly and involve additional weight and concerns for their reliability. Instead of such costly and heavy devices, this invention powers the fold hinges. In addition, the deployment forces are distributed through all of the fold axes, rather than at a single point at the base. This enables a much more efficient deployment with greater positional reliability of the deployed elements.

Figure 9:
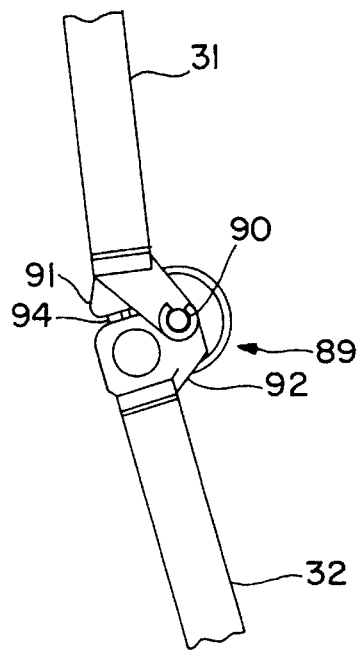
FIG. 9 is a side view as in FIG. 8 with the adjacent panels in their deployed condition.

This arrangement to power the hinges is elegantly simple, and is supplied for all of the fold axes, and preferably also on the attachment axes. Each such axis includes a hinge 89 (see FIGS. 8 and 9) with an axle 90 and brackets 91, 92. Preferably separate axles are supplied for every bracket. The brackets are attached to adjacent edges of adjacent panels, for example panels 31 and 32. A stop 93 on bracket 91 is threaded to the bracket so that its height above the bracket can be adjusted. Bracket 92 has a stop face 94 which will abut the stop when in the deployed position (FIG. 9). This establishes the deployed condition. Several but preferably two of these hinges will be placed along each of the axes which fold.

One or more torsional coil springs 95 surrounds the folding axes and exerts a positive bias force that biases the panels toward the deployed condition. The spring will be pre-loaded so as to exert a torque between the panels, even when the array is fully deployed. Any number of springs may be provided at each fold line. The bias force can be varied by changing the number of springs.

It will be evident that energy will be required to force the array to its stowed position. This will be done manually by the forces required to overcome the resistance of the hinge springs. The energy remains stowed in the springs, available to power the array to its deployed condition.

While only three panels are shown for each set, it will be understood that more or fewer panels can be used in each set with the same advantages, and the number of sets can also be increased. The tong-like kinematic movement is the objective.

Spacecraft are critically dependent on the energy generated by their solar cell arrays, and on the efficiency of these arrays. Any diminution of energy output below that postulated for the array can shorten the useful life, of the craft, which is a very costly consequence. Also, should the array not deploy at all, it can result in failure of all or part of the mission's objectives.

Problems to be avoided are binding at pivots and fold hinges, and distortions of the panels due to extreme temperature differences on opposite sides of an array.

In the preferred embodiment of this invention, a pivot pin such as shown in FIG. 10 is used for pivot pins 50, 51, and 52. Its advantage is redundancy.

Figure 11:
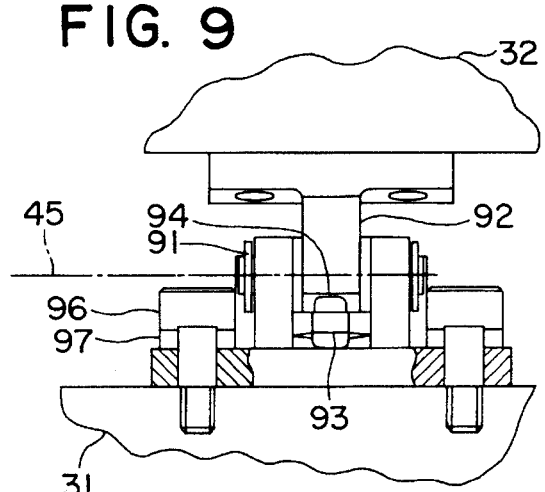
FIG. 11 is a side view, partly in cutaway cross-section showing a thermally tolerant fold hinge useful in this invention.
Figure 12:
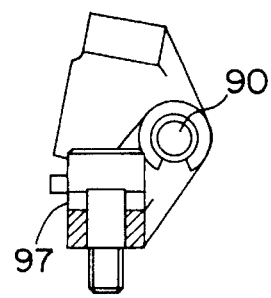
FIG. 12 is a right hand side view of FIG. 12.

In spacecraft applications where temperature gradients will exist in the stowed configuration from inner panel 33 to outer panel 31 as shown in FIG. 4 a temperature compensating version of the fold hinge 89 may be used to reduce resultant structural loading. This hinge, FIG. 11, utilizes Belleville spring washers 97 to provide a deflection degree of freedom to accommodate the expected thermally induced deflections. As said deflections occur bracket 91 is allowed to unseat from the edge of panel 31, sliding along shoulder screw 96 against the preload force provided by spring washers 97. This preload force is sized in conjunction with the strengths of the panels and pivot hinge assemblies with regard to thermally induced loading.

This invention is not to be limited by the embodiments shown in the drawings and described in the description, which are given by way of example and not of limitation, but only in accordance with the scope of the appended claims.

We claim:

1. A stowable and self deployable parallelogram type panel array comprising:

a first set and a second set of rigid panels, each panel having a pair of parallel sides and a pair of parallel ends, said sets extending parallel to one another, on opposite sides of a central axis of the array;

a fold hinge joining the ends of adjacent panels in each set, each fold hinge mounting its respective panels to fold toward and away from each other along a fold axis, said fold axes being normal to a plane which includes the central axis;

pivot hinges rotationally connecting adjacent panels of the two sets at the mid-point of their adjacent sides for rotation around pivot axes which are parallel to the fold axes;

a base;

a first yoke and a second yoke journaled to said base for rotation around a respective yoke axis which is parallel to the hinge fold axes;

a first attachment hinge and a second attachment hinge respectively joining respective first and second yokes to an end of a panel in the first and second set, for rotation around a respective attachment axis which is parallel to the fold axes;

coordinating means interlinking said yokes whereby angular movement of one yoke is accompanied by an equal and opposite angular movement of the other yoke, said coordinating means comprising, a first gear and a second gear integral with said first and second yokes, respectively, and rotationally mounted to said base to journal said first and second yokes around said yoke axes, said gears having respective axes of rotation on said yoke axes, and also having identical teeth meshed together to coordinate the rotation of said yokes, the said axes of rotation being on opposite sides of said central axis from their respective set of panels when viewed in a plane normal to said hinge fold axes; and power means in each fold hinge biasing adjacent panels toward their deployed condition, said power means constituting the only source of force for deployment of the array.

2. A panel array according to claim 1 in which said power means is a spring included in each of said fold hinges opposed to stowing movement of said panels, said spring being compressed by forcing the panels to their stowed condition, the resulting stored energy providing power to deploy the array when the array is released for deployment and to provide anti-backlash force when the array is deployed.

3. A panel array according to claim 2 in which the said fold hinges include a hinge pin, said spring being a coil spring wound around the axis of said hinge pin.

4. A panel array according to claim 1 in which said pivot hinges include a pair of brackets, one attached to each of the panels being joined, a hinge pin pivotally joining said brackets for relative rotation, a limit stop on each,said bracket, said limit stops engaging one another in the deployed condition to restrain the array from further deployment.

5. A panel array according to claim 4 in which one of said limit stops is adjustable relative to its bracket, whereby to enable adjustment of the relative angle of the panels when restrained.

6. A panel array according to claim 4 in which said power means is a spring included in each of said fold hinges opposed to stowing movement of said panels, said spring being compressed by forcing the panels to their stowed condition, the resulting stored energy providing power to deploy the array when the array is released for deployment and to provide anti-backlash force when the array is deployed.

7. A panel array according to claim 1 in which a rotational damper is disposed between each yoke and its adjacent panel to restrain the rate of deployment.

8. A panel array according to claim 1 in which said fold hinges include compressible spring means to enable it to be shifted relative to its respective panel, whereby to permit said panels to lengthen without distortion.

* * * * *